Oct. 19, 1954
R. J. EHRET
2,692,359
MEASURING AND CONTROLLING APPARATUS
Filed April 5, 1952
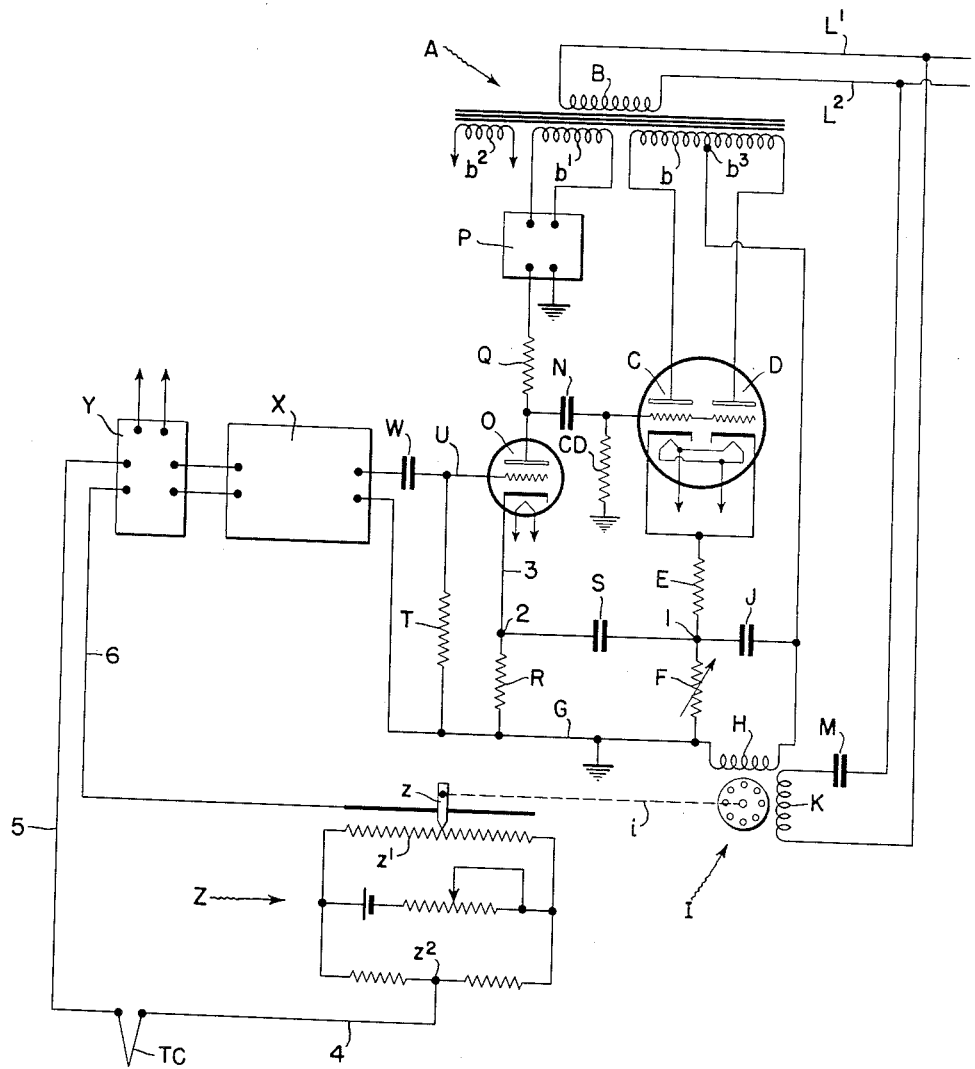
*INVENTOR.*
ROBERT J. EHRET
BY
Arthur H. Swanson
ATTORNEY.

Patented Oct. 19, 1954

2,692,359

UNITED STATES PATENT OFFICE 2,692,359

MEASURING AND CONTROLLING APPARATUS

Robert J. Ehret, Philadelphia, Pa., assignor to Minneapolis-Honeywell Regulator Company, Minneapolis, Minn., a corporation of Delaware Application April 5, 1952, Serial No. 280,819

6 Claims. (Cl. 318—29)

The present invention relates to self-balancing apparatus comprising an amplifier and electrical motor for positioning or moving a controlled object in response to an actuating electrical signal.

A general object of the invention is to provide an improved cooperation between the amplifier and motor to permit useful operation of the apparatus under operating conditions which would otherwise produce objectionable over-travel and consequent hunting of the motor.

In a preferred apparatus embodiment of the present invention, there is provided a motor having motor energizing circuit means connected to the output circuits of two electronic motor drive valves, each including an anode, a cathode, and a control grid, and an electronic amplifier connected to the control grids of said valves, and operating to make one of said valves more or less conductive than the other, in response to the departure in one direction or the other from a normal or zero value of a control signal amplified in said system. When the conductivities of the two valves are made unequal by a variation in said signal, the motor is operated to produce a control effect which returns the control signal to its normal or zero value, and thus interrupts the operation of the motor.

Said motor is a reversible two-phase alternating current motor having a control winding and a power winding. The control winding forms a part of the above mentioned circuit means, and when one of said valves becomes more conductive than the other, an alternating current is caused to flow through the control winding which is of a phase displaced 180° from the phase of the current flowing in the winding when said one valve becomes less conductive than the other. The power winding of the motor is connected to a source of alternating current of the above mentioned frequency, but displaced in phase from the current flowing through the control winding. When the motor is standing still, the electro-magnetic field established by the power winding of the motor does not link the control winding of the motor, and little or no flux produced by the power winding cuts the turns of the control winding. Upon rotation of the motor, however, the field established by the power winding is distorted so that some of the power winding flux cuts the turns of the control winding, and thus tends to produce a voltage in the control winding.

It is an object of the present invention, therefore, to provide simple, novel and effective means to utilize the last mentioned voltage in subjecting the motor to a novel damping effect as the motor drive signal impressed on the control grids of the motor drive valves is diminishing and approaches a zero value, and the motor tends, as a result of inertia, to over-travel.

In the preferred form of the present invention hereinafter described in detail, use is made of self-balancing measuring and control apparatus of the well known and widely used type disclosed and claimed in the Wills patent, No. 2,423,540, granted July 8, 1947. That apparatus comprises a normally balanced potentiometric measuring circuit which is unbalanced by changes in the quantity measured and which is automatically rebalanced by a reversible electric motor. The operation of the motor is controlled by an electronic voltage and power amplifying system responsive to unbalance of said network.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

The accompanying drawing is a diagram illustrating a preferred form of the present invention.

The transformer A shown in the drawing, supplies energizing current to measuring and control apparatus of the type shown in said prior Wills patent. As diagrammatically shown, the transformer A comprises a primary winding B having its terminals connected to alternating current supply conductors L' and L² adapted to supply alternating current of conventional frequency and voltage, for example, 60 cycles per second and 115 volts. As shown, the transformer A includes three secondary windings b, b' and b². The secondary winding b has one end terminal connected to the anode of a triode valve C and has its other end terminal connected to the anode of a second triode valve D. The triodes C and D may well be the two triodes included in a twin tube of the commercially available 7N7 type. The cathodes of the valves C and D are connected to one terminal of a common cathode resistor E. The second terminal of that resistor is connected through a second resistor F to a grounded conductor G. The latter is connected through the control winding H of a motor I to the midpoint of the secondary winding b through a center tap b³.

A condenser J and the resistor F in parallel with the winding H, cooperate with the latter to form a parallel-resonant circuit. The power winding K of the motor I is connected across the supply conductors L' and $L^2$ in series with a condenser M to form a series-resonant circuit. The motor I is of conventional rotary field type, and the control winding H and power winding K cooperate to create a motor field which rotates in one direction, or in the opposite direction depending upon the phase of the signal impressed on the control grids of the valves C and D.

As shown in the drawing, the connected control grids of the valves C and D are connected to ground through a resistor CD and are coupled through a condenser N to the output circuit of a triode O which may be of the commercially available 7F7 type. The valve O may be assumed to be the stage amplifier valve of a three stage voltage amplifier of the character illustrated in the Wills patent. The anode of the valve O is connected through an anode resistor Q to the output terminal of a rectifier P which rectifies the output current of the transformer secondary $b'$. The cathode of the valve O is connected to the grounded conductor G through a resistor R. The junction point 1 of the resistors E and F is connected through a condenser S to the point 2 at which the cathode terminal 3 of the valve O is connected to ground through a resistor R, and is connected through a condenser W and conductor U to the output circuit of the second stage valve of the three stage voltage amplifier of said Wills patent.

In the accompanying drawing, the first and second stage valves of the voltage amplifier are represented by the diagram block X, and the diagram block Y represents a converter of the type disclosed in the Wills patent for converting into alternating current, the small unidirectional current signal developed when a normally balanced potentiometric measuring circuit Z is unbalanced as a result of a change in the value of the quantity measured. That quantity, as diagrammatically illustrated by way of example, is the voltage of a thermocouple TC. The latter is shown as connected in a detector circuit which connects a wiper contact $z$ engaging and adjustable along the length of a slide wire resistor $z'$ included in one branch of the circuit Z, to a fixed point $z^2$ in a second branch of said circuit. Normally the thermocouple voltage is balanced by the potential difference between the points $z$ and $z^2$ of the circuit Z. On a change in the thermocouple voltage, the measuring apparatus is temporarily unbalanced, and unidirectional current then flows through a detector circuit including the thermocouple TC and the input winding of the converter Y. As shown, one terminal of the thermocouple TC is connected to the point $z^2$ by a conductor 4, the second thermocouple terminal is connected by a conductor 5 to one input terminal of the converter Y, and the second converter input terminal is connected by a conductor 6 to the wiper contact $z$.

The unidirectional current flow thus developed in the detector circuit, operates in the converter Y to produce an alternating current signal which is impressed on the voltage amplifier including the section Y and valve O. As diagrammatically indicated, the converter is energized through conductor connections to the transformer secondary winding $b^2$. The frequency of the signal impressed on the voltage amplifier is thus the same as the frequency of the current developed in the secondary winding $b$. The phase of the signal current developed by the converter Y is the same as, or is displaced 180° from the phase of the alternating current impressed on the anode of one of the valves C and D, depending on whether the change in the thermocouple voltage is an increase or a decrease. The winding $b^2$ may also energize the valve heating filaments.

The energization of the motor I, effected when the measuring apparatus is unbalanced, causes the motor I to operate in the direction and to the extent required to rebalance the measuring apparatus. The motor effects the rebalancing operation by adjusting the wiper contact $z$ along the slide wire $z'$ until the potential difference between the contact $z$ and circuit point $z^2$ becomes equal in magnitude to the potential difference between the terminals of the thermocouple TC. The motor thus adjusts the contact $z$ through a connection $i$. Further explanations with regard to the operation of the measuring and rebalancing apparatus diagrammatically shown, are believed to be unnecessary in view of the full disclosure of the apparatus in said Wills patent.

The apparatus hereinbefore illustrated and described, differs significantly from the apparatus shown in said Wills patent in the inclusion of the resistor F section of the cathode resistor of the valves C and D in series with the condenser J in the parallel-resonant circuit including the motor control winding H. The apparatus illustrated and described also differs desirably, but less significantly, from the apparatus shown in said Wills patent, by the condenser S connecting the point 1 to the junction point 2 of the resistor R with the cathode terminal 3 of the valve O.

In apparatus of the character described and illustrated, the resistance of the resistor E may well be 150 ohms, the maximum resistance of the variable resistor F may well be 10 ohms, the resistance of the resistor R may be 5,600 ohms, the resistance of the resistor CD may be 470,000 ohms, and the capacity of each of the condensers J and S may well be 1.0 microfarad.

The inclusion of the cathode resistor section F of the valves C and D in series with the condenser J in the parallel-resonant circuit which includes the motor control winding H, condenser J, and resistor F connected in series provides a novel and useful motor damping action. That action is a result of a current signal provided by the resistor F during periods in which the motor is rotating, and which is a result of the effect on the control winding H of the magnetic flux created by the power winding K. When the motor is at rest, the flux created by the winding K has no significant signal producing effect on the winding H, but when the motor is in rotation, the magnetic field created by the winding K is distorted, in a direction depending on the direction of motor rotation, so as to be cut to a significant extent by the control winding H.

With a substantial motor drive current flowing through the winding H, as is needed for a relatively rapid acceleration of the rebalancing mechanism, the signal developed in the resistor F as above described, has no significant damping effect but does increase the current flow through the motor winding H, and thereby the motor torque, due to positive feedback. The positive feedback is due to the voltage developed across the resistor F which is fed through the condenser S to junction 2 where the cathode of amplifier O is connected. The phasing of the signal on the cathode will be such as to increase the controlling signal being amplified by the amplifier device O. This increase in current flow produces a corresponding increase in the torque developed by the motor and assists in the rapid attainment of full speed motor operation. As the motor attains full speed operation, the magnitude of the counter E. M. F. in winding H approaches the applied voltage from tubes C and D and thus effects a reduction in the current flowing through the winding H and the resistor F to a small value and thereby effects a corresponding reduction in the positive feedback action. However, as balance is approached the amplifier input voltage decreases, and the motor drive voltage applied to the winding H diminishes while the motor continues to rotate as a result of inertia. The consequent predominance of the counter E. M. F. in winding H produces a reversal in the direction of current flow through the winding H and resistor F. The signal then transmitted from the variable resistor F to the control grids of the valves O, C and D, subjects the motor to a significant damping action which slows down the motor and stops it at approximately the instant at which the amplifier input signal decreases to zero.

The damping action of the feedback signal has been found to significantly improve the operation of the apparatus illustrated and described, under operating conditions which would otherwise produce objectionable over-travel of the motor.

Such improved operation is a direct result of the selective character of the closed series resonant circuit comprising resistor F, condenser J and winding H in responding with greater sensitivity to desired 60 cycle motor drive signals than to signals of higher frequency. The fly wheel effect of this resonant circuit enhances the response of the circuit to the presence of the 60 cycle signal and cuts down the effect of other signals present. Specifically, with this connection, the tendency for higher frequency currents to flow through the winding H and resistor F is diminished because of the by-passing action of condenser J and the impeding action of the inductance of the winding H. Since the feedback voltage is established entirely by the currents flowing in the winding H and the resistor F, the 60 cycle signal voltages in the output circuits of the tubes C and D are accentuated, and the higher frequency signal voltages, including 120 cycle components, are suppressed. Thus, the tendency for the positive feedback connection to cause oscillation and instability of the amplifier and the motor drive circuit is substantially reduced. This permits a greater amount of useful feedback for 60 cycle signals.

A portion of the signal developed as a result of the interaction of the windings K and H, is also fed back through the ground connection to the common end terminal cd of the valves C and D, and thus impresses a relatively small signal on the control grids of the valves C and D. The resistor R and condenser S contribute somewhat to the beneficial damping action obtained with the apparatus shown in the drawing, but a good damping action is obtainable with the apparatus illustrated when modified by the omission of the resistor R from the cathode ground connection of the valve O, and by the omission of the condenser S from the connection between that cathode and the junction point of the resistors E and F. The magnitude of the damping signal may be regulated by varying the resistance of the variable resistor F.

While, in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patents is as follows:

1. Motor control apparatus of the type comprising a motor drive stage and an amplifying stage, each of said stages having an input circuit and an output circuit, means connecting the output circuit of said amplifying stage to the input circuit of said motor drive stage, a reversible two-phase alternating current motor having a power winding with terminals for connection to a source of alternating current and having a control winding connected in the output circuit of said motor drive stage, said power winding and said control winding being arranged in inductive relation so that upon rotation of the motor an alternating voltage of the same frequency is induced in said control winding from said power winding, a resistor connected in the output circuit of said motor drive stage, so as to have a voltage thereon due to the motor drive voltage or the induced voltage in said control winding, a connection to apply the voltage produced across said resistor directly to the input circuit of said amplifying stage, and means to apply a motor drive signal of the first mentioned frequency and of one phase or of the opposite phase to the input circuit of said amplifying stage to control the rotation and the direction of rotation of said motor, said voltage on said resistor when produced by said motor drive stage driving said motor acting regeneratively with the motor drive signal in said amplifying stage and degeneratively with the motor drive signal when the induced voltage in said control winding exceeds the motor drive stage driving action on said control winding.

2. An improvement as specified in claim 1, comprising a condenser connected in series with said resistor and control winding wherein said condenser, resistor and control winding are so related as to form a series resonant circuit at said frequency.

3. In motor control apparatus of the type comprising a pair of motor drive valves each having an anode, a cathode, and a control grid, a cathode resistance comprising a first resistor having one end connected to each of said cathodes and a second resistor connecting the second end of said first resistor to ground, an energizing transformer comprising a primary winding having terminals for connection to a source of alternating current, and a secondary winding having one end terminal connected to one of said anodes and having its other end terminal connected to the second of said anodes, a reversible two-phase alternating current motor having a control winding and a series-resonant power winding with terminals for connection to a source of alternating current of the same frequency as the first mentioned source, an amplifier including an electronic valve having an anode, a control grid, and a cathode, and having said cathode and anode connected in an energizing circuit, and having said control grid and cathode connected in an input circuit connected to ground, a second condenser connecting the anode of said amplifier valve to the control grids of the first mentioned valves, and a normally balanced mechanism adapted when unbalanced, to impress on the control grid of the ampifier valve an alternating current signal of the first mentioned frequency and of a phase which is the same as, or opposite to the phase of the current supplied to one of the first mentioned anodes, the improvement comprising a condenser, said condenser and second resistor being connected in series with one another and in parallel with said control winding to form a parallel-resonant circuit connected between ground and the mid-point of said secondary winding, means actuated by said motor when said signal is established for operation to adjust said mechanism in the direction and to the extent required to rebalance the latter, said resistor and the first mentioned condenser being relatively proportioned to cooperate with said windings in developing a damping signal impressed by said control winding on said second resistor as said mechanism approaches and attains its balanced condition while said motor continues to rotate as a result of inertia, and circuit means connecting said damping signal to the cathode of said amplifier valve so that said valve will act degeneratively on the operation of said motor drive valves.

4. An improvement as specified in claim 3, in which said second resistor is adjustable.

5. An improvement as specified in claim 3, wherein said circuit means comprises a third resistor, having one end connected to ground and having its other end connected to the cathode of said electronic valve, and a third condenser connecting the second end of said third resistor to the connected end of said first and second resistors.

6. Control apparatus for a reversible electrical motor having a line winding, a control winding and a rotor which will induce in said control winding a counter E. M. F. dependent upon the speed of rotation of said rotor, comprising in combination, an output power amplifying device having said control winding connected thereto, a resistor in series with said control winding, a condenser connected across said series connected resistor and control winding to form with said winding a resonant circuit, a signal amplifying device having an input and an output, means connecting the output of said signal amplifying device to control the operation of said power amplifying device, a control signal source arranged for connection to the input of said signal amplifying device, and a condenser directly connecting a voltage on said resistor to the input of said signal amplifying device, said voltage acting regeneratively on the action of said power amplifying device when said power amplifying device is supplying to the control windng a signal greater than the counter E. M. F. in said winding and degeneratively on the action of said power amplifying device when the counter E. M. F. on said winding exceeds the signal from said power amplifying device.

References Cited in the file of this patent

UNITED STATES PATENTS

| Number | Name | Date |
|---|---|---|
| 2,508,640 | Kuhlemeier | May 23, 1950 |
| 2,527,893 | Smith | Oct. 31, 1950 |
| 2,528,054 | Harrison | Oct. 31, 1950 |
| 2,529,490 | Field | Nov. 14, 1950 |
| 2,595,034 | Wild | Apr. 29, 1952 |